Nov. 27, 1923.　　　　　　　　　　　　　　　　　1,475,801
F. A. N. CUCCIA

MECHANISM FOR CUTTING AND TRANSLATING MACARONI AND THE LIKE

Filed Oct. 31, 1919

WITNESS:

INVENTOR.
BY Frank A. N. Cuccia.

Victor J. Evans
ATTORNEY.

Patented Nov. 27, 1923.

1,475,801

UNITED STATES PATENT OFFICE.

FRANK A. N. CUCCIA, OF BROOKLYN, NEW YORK.

MECHANISM FOR CUTTING AND TRANSLATING MACARONI AND THE LIKE.

Application filed October 31, 1919. Serial No. 334,718.

*To all whom it may concern:*

Be it known that I, FRANK A. N. CUCCIA, a citizen of the United States, residing at Brooklyn, in the county of Kings and State of New York, have invented new and useful Improvements in Mechanism for Cutting and Translating Macaroni and the like, of which the following is a specification.

This invention relates to machines embodying translating and cutting devices.

Some of the objects of the invention are: To produce a machine which is particularly suitable for taking up macaroni, spaghetti, noodles and the like, as they pass from the producing machine, for translating and for cutting the macaroni or the like, in predetermined lengths; to produce a machine embodying an endless movable support which is provided with grooves which accommodate a reciprocating knife during travel of the support by virtue of which the macaroni may be cut into predetermined lengths; to provide grooves or the like in a movable support of such number and so arranged that the macaroni may be cut in predetermined lengths and to permit the cut macaroni to be removed from the support in a sanitary manner, since the knife at predetermined intervals is made to enter every other groove as the support in timed accord traverses the knife. With these and other objects in view the invention resides in the particular provision and combination of elements more fully described in the following specification and illustrated in the accompanying drawings.

Figure 1:
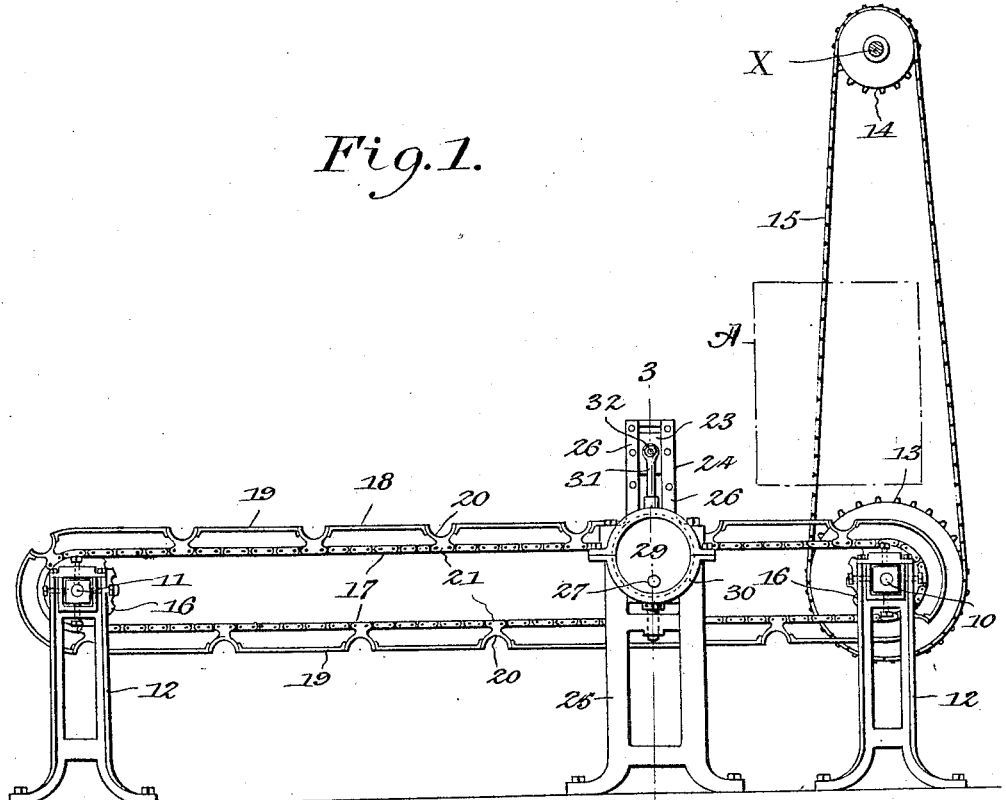
Figure 1 is a side elevation.
Figure 3:
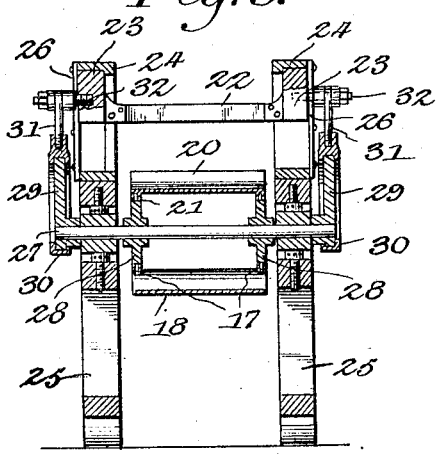
Figure 3 is a transverse sectional view on the line 3—3 of Figure 1.
Figure 2:
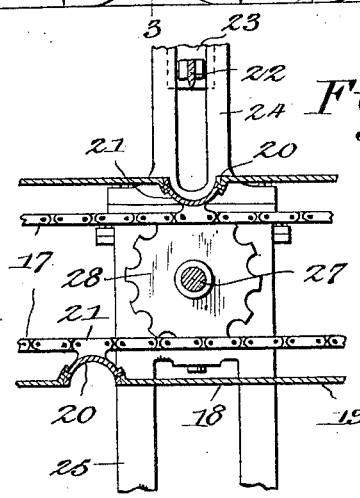
Figure 2 is an enlarged central sectional view through the movable support and the knife.

Generally stated, the invention resides in the arrangement of a machine in conjunction with a second machine that produces the goods to be cut such as macaroni, spaghetti, noodles and the like, so that, as in the present instance, macaroni, may be taken up as it passes from the macaroni machine A, conventionally illustrated in the drawing, and to be cut in predetermined lengths and to be removed by the machine without necessitating physical handling thereof by the hands.

More specifically the machine comprises driven shafts 10 and 11 journaled in brasses adjustably mounted in brackets 12. The shaft 10 is driven from the drive shaft X of the macaroni machine through the intervention of sprockets 13 and 14 and a chain 15. Sprockets 16 are mounted on the shafts 10 and 11, there being two sprockets on each of said shafts arranged in spaced relation. Encircling the sprockets 16 of shafts 10 and 11 are drive chains 17. Supported for movement with the chains 17 is an endless support 18 which in the present instance is made up in sections 19 of canvas or other stout fabric. The sections 19 are of equal lengths and have their ends secured to channel members 20 having portions 21 for the attachment of the member 20 to the chains 17. Inasmuch as the sections 19 are of equal length the channels will occur equidistantly apart.

In order that the macaroni may be cut into predetermined lengths there is provided a reciprocating knife which operates in timed accord in conjunction with the movable support 18. The timing of the knife is such that it descends to enter every other space provided by the channel members 20, to coact with a portion of the channel member which it enters to cut or divide the macaroni. The knife 22 is secured to slide blocks 23 which are arranged for movement in slide stands 24 secured in any suitable manner to brackets 25. The slide blocks operate in ways in the slide stands and are held in place by gibs 26. Reciprocation of the knife 22 is effected by the provision of a shaft 27 journaled in adjustable bearing blocks mounted in brackets 25. The shaft 27 derives motion by the intervention of sprockets 28 which are mounted on the shaft 27 and engage the chains 17. Cams 29 are mounted on the shaft 27. The cams are equipped with cam-straps 30. Links 31 are connected to the cam-straps 30 and are also connected to studs 32 secured to the slide blocks 23.

From the foregoing it will be manifest that the macaroni may be picked up as it passes from the producing machine and that it is translated, and as it traverses the path of travel of the knife 22 it will be severed as the knife descends. The descent of the knife is timed to enter every other channel member 20 thus leaving a certain channel member disposed intermediate the length of the cut macaroni so that a suitable stick or rod may be thrust through the intermediate channel member 20 spoken of. In this way the cut macaroni may be removed from the support 18 with the stick mentioned, for the sanitary handling of the cut macaroni. Hitherto the cutting has been done under less favorable and sanitary conditions and the present invention is to meet demands occasioned by inability to properly cut the macaroni or the like in equal lengths under sanitary conditions.

What is claimed as new is:—

1. In a machine of the class described, the combination of a continuously movable support having grooves to provide spaces in the supporting surface of said support, and cutting mechanism including a reciprocating knife operating in timed accord with the movement of said support so as to enter every other space in said support and to coact with portions of said support to set up a cutting action.

2. In a machine of the class described, the combination of an endless support comprising sections, channel members arranged between said sections to provide spaces in the supporting surface of said support means for moving said support and cutting mechanism including a reciprocating knife, operating in timed accord with the movement of said support so as to enter every other space in said support, and to coact with a portion of each of said channel members to set up cutting action.

In testimony whereof I have affixed my signature.

FRANK A. N. CUCCIA.